United States Patent
Cochart et al.

(10) Patent No.: US 7,823,603 B2
(45) Date of Patent: Nov. 2, 2010

(54) MIXING VALVE

(75) Inventors: Chad J. Cochart, Sheboygan, WI (US);
Chad M. Slater, Sheboygan, WI (US);
Michael J. Wandschneider, Kohler, WI (US)

(73) Assignee: Kohler Co., Kohler, WI (US)

( * ) Notice: Subject to any disclaimer, the term of this patent is extended or adjusted under 35 U.S.C. 154(b) by 445 days.

(21) Appl. No.: 11/430,490

(22) Filed: May 9, 2006

(65) Prior Publication Data

US 2007/0000547 A1    Jan. 4, 2007

Related U.S. Application Data

(60) Provisional application No. 60/679,168, filed on May 9, 2005.

(51) Int. Cl.
*F16K 11/087* (2006.01)

(52) U.S. Cl. .............. 137/625.41; 137/625.17; 137/625.4; 137/625.46; 251/285; 251/288; 236/12.11

(58) Field of Classification Search .......... 137/614, 137/624.4, 625.17, 625.4, 625.41, 625.46; 236/12.1, 12.11, 12.12; 251/285, 288
See application file for complete search history.

(56) References Cited

U.S. PATENT DOCUMENTS

| | | | | |
|---|---|---|---|---|
| 1,644,581 A | * | 10/1927 | Guyer | ............ 60/695 |
| 3,021,868 A | | 2/1962 | Kovach | |
| 3,023,784 A | * | 3/1962 | Monson | ........ 137/625.17 |
| 3,115,896 A | * | 12/1963 | Roberts et al. | ...... 137/625.41 |
| 3,680,150 A | * | 8/1972 | Bowerman | ........... 4/393 |
| 3,840,967 A | * | 10/1974 | Olson | ........... 29/221.6 |
| 4,089,347 A | * | 5/1978 | Christo | ........ 137/625.41 |
| 4,387,880 A | * | 6/1983 | Saarisalo et al. | ......... 251/285 |
| 4,458,839 A | * | 7/1984 | MacDonald | ........ 137/625.4 |
| 4,609,007 A | * | 9/1986 | Uhl | ............. 137/270 |
| 4,768,557 A | * | 9/1988 | Holzer | ........... 137/636.2 |
| 4,813,455 A | * | 3/1989 | Iqbal | .......... 137/625.17 |
| 5,230,465 A | * | 7/1993 | Kostorz et al. | ........... 236/12.1 |

(Continued)

FOREIGN PATENT DOCUMENTS

GB    2206676    1/1989

(Continued)

OTHER PUBLICATIONS

PCT International Search Report for corresponding PCT International Application No. PCT/US2006/017826, dated Mar. 28, 2007.

(Continued)

*Primary Examiner*—John Rivell
*Assistant Examiner*—Craig Price
(74) *Attorney, Agent, or Firm*—Quarles & Brady LLP (57) ABSTRACT

A mixer valve includes a rotational assembly for selecting a temperature of the water up to a maximum temperature. The rotational assembly includes a selectable "comfort" temperature indicator, that can be set independently of the maximum temperature, and does not affect the maximum temperature. The valve also includes check valves for preventing cross flow between the hot and cold pipes. A check valve insert is provided which includes a shutoff for the water flow when removing the check valve for service. The shutoff and removal of the check valve can be effected with a single tool.

5 Claims, 6 Drawing Sheets

U.S. PATENT DOCUMENTS

| | | | |
|---|---|---|---|
| 5,240,040 A | | 8/1993 | Barnum et al. |
| 5,330,224 A | * | 7/1994 | Terwilliger et al. ............ 279/51 |
| 6,021,952 A | * | 2/2000 | Antoniello et al. ....... 236/12.16 |
| 6,202,693 B1 | * | 3/2001 | Bollo .................... 137/625.17 |
| 6,227,246 B1 | | 5/2001 | Hall et al. |
| 6,279,604 B1 | | 8/2001 | Korb et al. |
| 6,820,816 B1 | | 11/2004 | Reid |
| 6,907,903 B1 | * | 6/2005 | Chang ................... 137/625.17 |
| 2003/0183275 A1 | | 10/2003 | Yang |
| 2004/0000594 A1 | | 1/2004 | Beck et al. |
| 2006/0016491 A1 | * | 1/2006 | Rosko et al. ............. 137/625.4 |
| 2006/0042704 A1 | * | 3/2006 | Rosko ................... 137/625.41 |

FOREIGN PATENT DOCUMENTS

GB    2251479    7/1992

OTHER PUBLICATIONS

A Sep. 24, 2009 extended European search report in application 09000600.8 in an application corresponding to the present one.

* cited by examiner

MIXING VALVE

CROSS-REFERENCE TO RELATED APPLICATION

This application claims the benefit of U.S. Provisional Patent Application No. 60/679,168 filed May 9, 2005.

STATEMENT OF FEDERALLY SPONSORED RESEARCH OR DEVELOPMENT

Not applicable.

BACKGROUND OF THE INVENTION

The present invention relates to mixing valves. More particularly it relates to thermostatic mixing valves with improved access to check valves and filter screens and improved settings for comfort temperatures.

Thermostatic mixing valves can provide a source of water having a desired temperature and can maintain the desired water temperature substantially constant once set. Such devices are well known in the art. See e.g. U.S. Pat. No. 6,279,604 and U.S. patent application publication 2004/0000594. Typically, the desired water temperature is obtained by controlling the relative proportions of hot and cold water admitted to a mixing chamber and adjusting the relative proportions to maintain the desired water temperature substantially constant.

To prevent the temperature from being set at a temperature that risks scalding, a temperature stop is typically provided on the mixing valve. The valves often also include a method for setting a lower "comfort" level.

To prevent cross flow between the hot and cold input lines, check valves can be provided between the hot and cold water supplies and the mixer valves. Also, screens can be provided to avoid debris from clogging the valve interior.

While thermostatic mixing valves are known in the art, these known devices suffer from a number of disadvantages. For example, in some prior art devices, when the comfort level is selected, the maximum temperature selection is determined by a fixed increment therefrom. In any event, to properly maintain the valve, the check valves and associated screens need to be periodically cleaned. This process can require the use of a number of tools, requires some skill, and can be time consuming.

Therefore, there remains a need for an improved thermostatic mixer valve in which the check valves and screens are easily and quickly cleaned. Furthermore, there remains a need for an improved thermostatic mixer valve that mechanically provides a user selectable comfort level independent of the maximum temperature level.

SUMMARY OF THE INVENTION

In one aspect, the present invention provides a mixing valve comprising a valve body having a check valve receptacle coupled to an inlet water passage and also an outlet water passage, and a check valve insert sized and dimensioned to be received in the check valve receptacle. The check valve insert has a stop body with a shutoff element and a check valve sized and dimensioned to be received in the stop body, wherein the stop body is selectively movable in the receptacle to position the shutoff element to decouple the inlet water passage from the outlet water passage. When so positioned, the check valve is selectively removable from the stop body for service.

In preferred forms, the stop body and check valve each include a receptacle sized and dimensioned to receive a single tool, such that the water flow can be deactivated and the check valve removed with the selected tool.

In another aspect of the invention, an assembly for setting an output temperature for a thermostatic mixer valve is provided. The assembly includes a thermostatic mixing cartridge having an undercap, an overcap including a first detent member, and a rotational stem adaptor coupled between the undercap and the overcap and having a second detent member. The first detent member and the second detent member interact to provide a comfort temperature setting.

In a preferred form of the invention, the undercap includes a maximum stop temperature tab. The rotational stem adaptor includes a tab for mating with the maximum stop tab to limit the output temperature to the selected maximum.

In another preferred form, the undercap can include a first plurality of teeth, and the overcap can include a second plurality of teeth that mate with the first plurality of teeth.

In another preferred form, the first detent member can be a ramp. The second detent member can be a flexible tab.

Thus, the present invention provides improved methods and apparatuses for maintaining or servicing check valves in a mixing valve, as well as improved means for selecting a comfort level temperature when the valve is a thermostatic mixing valve.

These and still other advantages of the present invention will become apparent from the following description. In the description, reference is made to the accompanying drawings which form a part hereof, and in which there are shown preferred embodiments of the invention. Such embodiments do not represent the full scope of the invention, and reference is made therefore, to the claims herein for interpreting the full scope of the invention.

DETAILED DESCRIPTION OF THE INVENTION

Referring now to the figures, a thermostatic mixer valve 10 includes a valve body 12 having cold and hot water inlets 14 and 16 respectively, and upper and lower water outlets 18 and 20 respectively. Check valve inserts 22 and 24 providing check valves (and filter screens) for each of the hot and cold water inlets 16 and 14 are received in check valve receptacles (service stop receptacles) 49 provided in the valve body 12. The valve body 12 further includes a cartridge chamber 26 for receiving a thermostatic cartridge assembly 27, including both a thermostatic mixer cartridge 36, and a temperature setting assembly 74 adapted to receive a knob or other actuator for selecting a temperature level.

The cartridge 36 includes cold and hot water inlets 28 and 30 and associated sealing gaskets 32 and 34 which are received in the valve body 12, and adjusts the temperature of the water supplied to the outlets 18 and 20 based on a position selected by the temperature setting assembly 74 in a manner known in the art. While a number of thermostatic mixer valve cartridges could be used in the present invention, one such cartridge is disclosed in U.S. patent application publication 2004/0000594, which is hereby incorporated herein by reference for its description of such devices. When using the described cartridge, the cartridge can be rotated one hundred and eighty degrees to reposition the hot and cold inlets, thereby allowing a user to account for errors in plumbing the pipes and various other situations in which the hot and cold inputs have been reversed.

Figure 2:
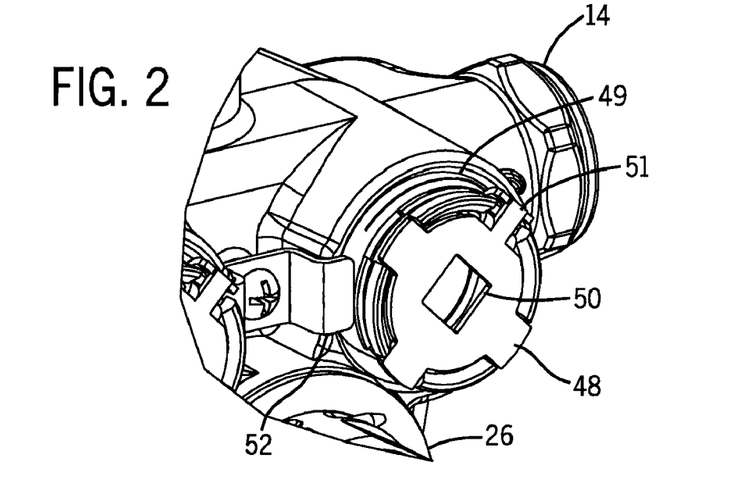
FIG. 2 is a partial view of the valve of FIG. 1, illustrating the drive lid for the service stop in the closed position.
Figure 3:
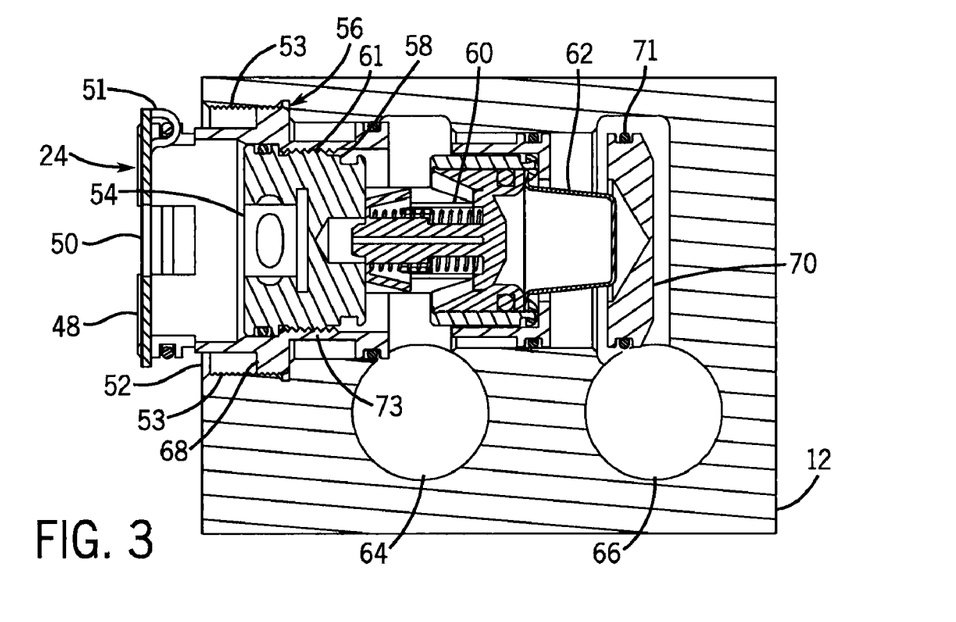
FIG. 3 is a view taken along the line 3-3 of FIG. 1, illustrating the check valve insert in the open flow position.

Referring now to FIGS. 2 and 3, the check valve insert 24 is inserted in a check valve receptacle 49. The check valve receptacle 49 is sized and dimensioned to receive the check valve insert 24, and includes an upper portion 53 that is threaded on the inside surface. Access ports are provided from the receptacle 49 to a water out passage 64 and a water in passage 66, such that water flows from the inlets 14 and 16 into the water passage 66 to the check valves 60, and out the water passage 64 to the cartridge 36 in normal operation.

Referring still to FIG. 3, the check valve insert 24 includes a service stop body 56 and a check valve 60, which is received in the service stop body 56. The service stop body 56 includes an upper portion with a radially-extending lip 68 that is threaded to mate with the upper portion 53 of the check valve insert 24, and a shutoff disc 70 at the opposing end in the receptacle 49. The lip 68 is positioned a distance from the top of the body 56 selected to locate the shutoff disc 70 to decouple the water inlet passage 66 from the water outlet passage 64 when servicing the check valve 60 as described below. To assure appropriate sealing, the shutoff disc 70 includes a rubber o-ring 71. An inner surface 73 of the upper portion of the body 56 is also threaded to receive the check valve body 58.

Referring still to FIG. 3, the check valve 60 is received into a check valve body 58 having a threaded upper portion 61 that mates with the threaded inner surface 73 of the upper portion of the service body 56, and a filter screen 62. A receptacle 54 is substantially centered in the check valve body 58 and is sized and dimensioned to receive a driving tool such as a ⅜" socket driver for threading the check valve body 58 into and out of the service body 56.

Figure 4:
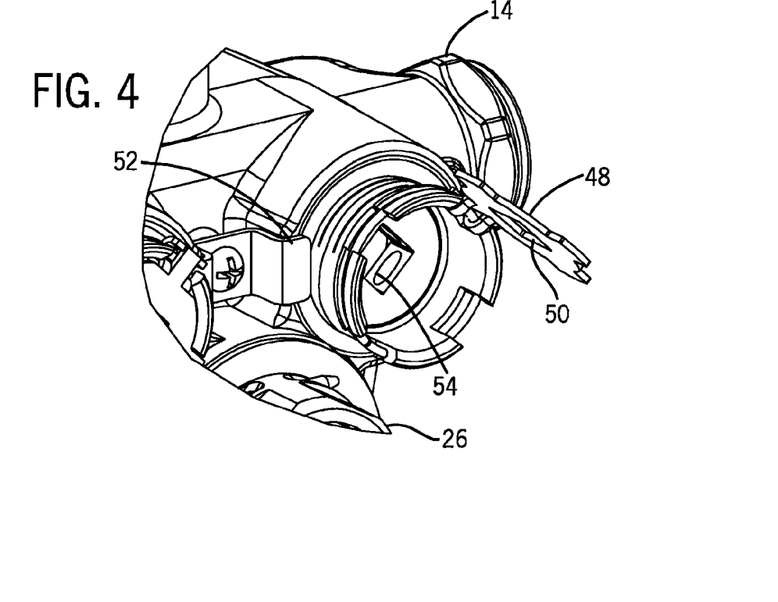
FIG. 4 is the same view as FIG. 2, but illustrating the service stop drive in the open position, allowing for the removal of the check valve.

Referring still to FIG. 3, and again also to FIG. 2, the service stop body 56 includes a hinged drive lid 48 that is coupled to the top of the service stop body 56 by a hinge 51. The drive lid 48 includes a receptacle 50, substantially centered in the drive lid 48, and also sized and dimensioned to receive the driving tool described above. A bracket 52 coupled to the valve body 12 extends over the edge of the check valve receptacle 49, and is positioned to interact with the radially-extending lip 68 from the service stop body 56 to limit motion of the service body 56 from the receptacle 49 for service. Referring now to FIG. 4, when the lid 48 is pivoted along hinge 51, the receptacle 54 in the check valve 60 can be accessed, and the tool inserted to remove the check valve body 58 and check valve 60.

Figure 5:
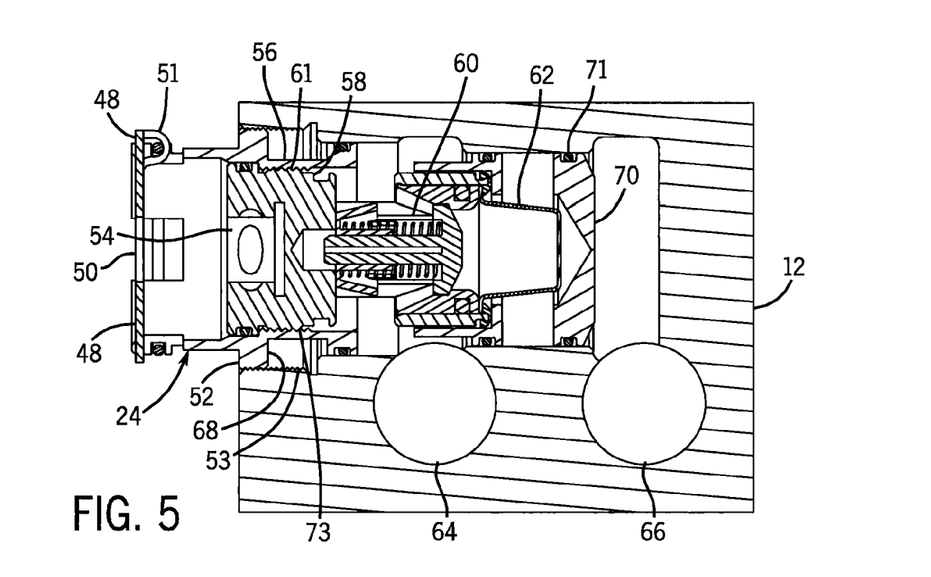
FIG. 5 is a view taken along the line 3-3 of FIG. 1 illustrating the check valve insert in the closed flow position.

To access the check valve 60 for service, the driving tool is inserted into the receptacle 50 in the drive lid 48 and the service stop body 56 is threaded counter-clockwise (upward) along the upper portion 53 of the check valve insert receptacle 49 until the lip 68 reaches the bracket 52, moving the check valve insert 24 from the position shown in FIGS. 2 and 3 to that shown in FIGS. 4 and 5. When the bracket 52 is reached, the shutoff disk 70 and associated rubber o-ring 71 are positioned in the check valve receptacle 49 to decouple the water input passage 66 from the water output passage 64, thereby preventing water flow into the receptacle 49 and effectively shutting off the valve 10, as shown in FIGS. 4 and 5.

Figure 6:
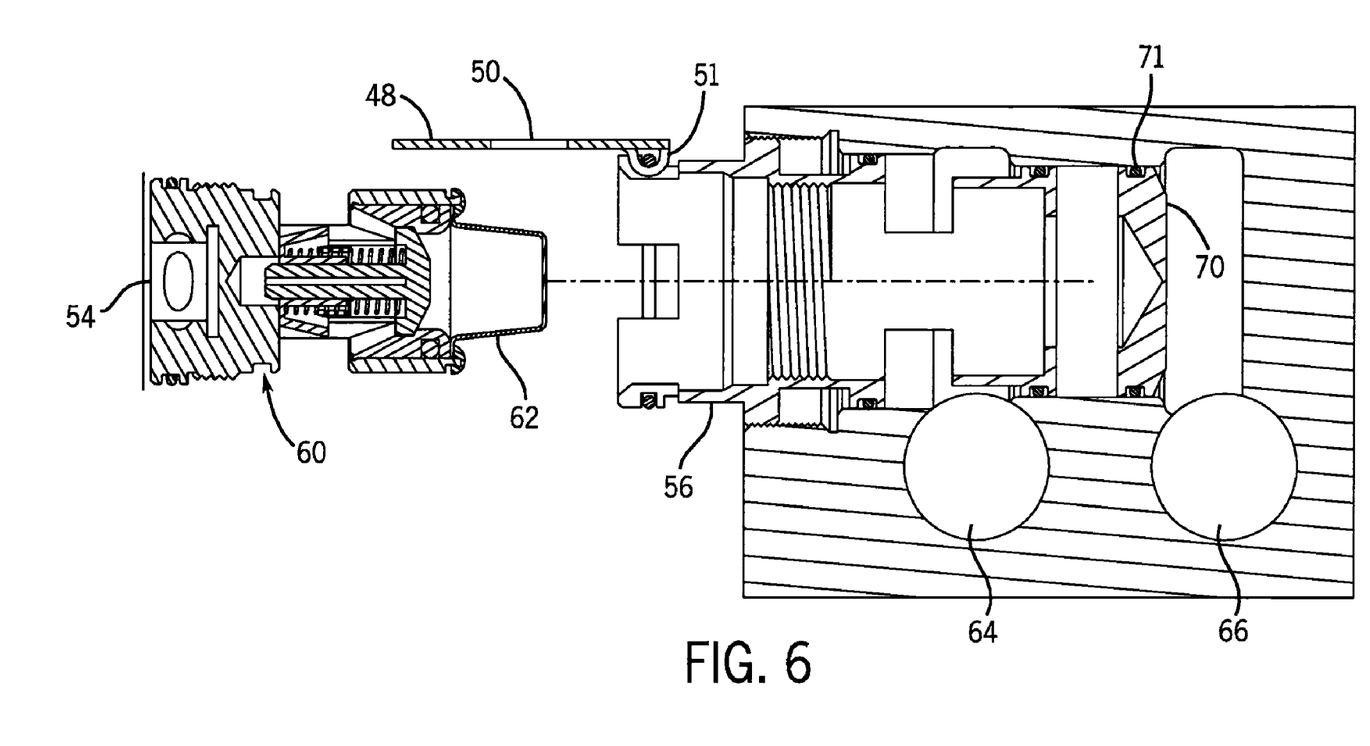
FIG. 6 is a view taken along the line 3-3 of FIG. 1 illustrating the check valve removed from the valve body for service.

When the valve is shut off, the check valve 60 and associated filter screen 62 can be removed as shown in FIG. 6 by inserting the same driving tool that was used to move the service stop body 56 into the receptacle 54 in the check valve 60. By providing the same receptacle in each of the service stop body 56 and check valve body 58, only one tool is required to remove the check valve body 58. After service is complete, the driving tool is again used to re-insert the check valve body 58 into the service stop body 56, and to drive the service stop body 56 back into the receptacle 49, and therefore to the position shown in FIG. 3.

Figures 7, 8:
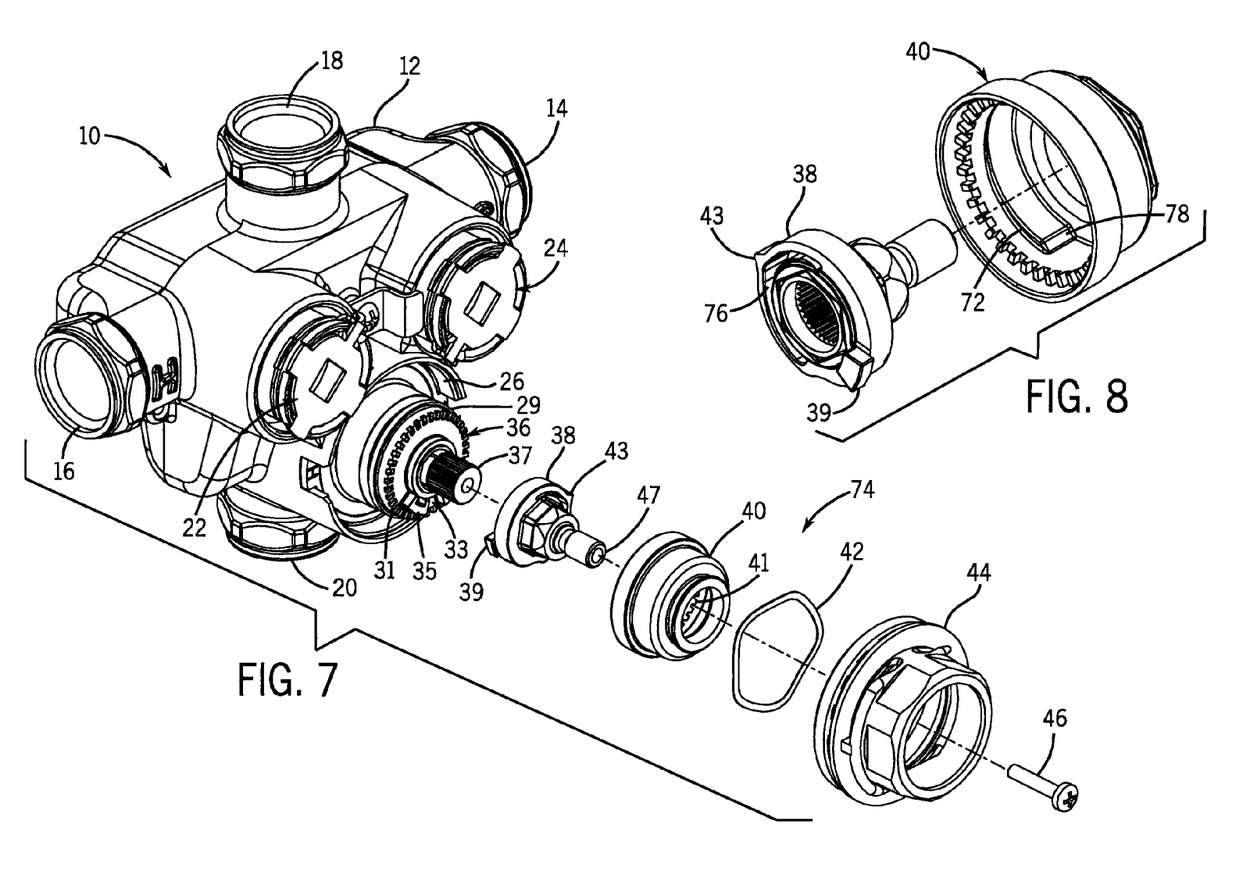
FIG. 7 is a view similar to FIG. 1, but with temperature setting assembly exploded.
FIG. 8 is an exploded view of the bottom of the stem adaptor of FIG. 7 received in the bottom of the detent cap of FIG. 7.

Referring now to FIG. 7, the thermostatic cartridge 36 includes a drive spindle 37 and undercap 29 to which the temperature setting assembly 74 is connected. The temperature setting assembly 74 includes a rotational stem adaptor 38, overcap 40, a wave compression spring 42 and a retaining nut 44. The undercap 29 of the thermostatic cartridge 36 further includes a plurality of teeth 31 extending radially around the circumference of the cartridge 36, and which mate with teeth 41 in the overcap 40. A pair of rotational stop tabs 33 and 35 are provided on the undercap 29 coupled to the thermostatic mixer cartridge 36 to provide a minimum and a maximum temperature position for the temperature setting assembly 74, and therefore to limit the rotation of the assembly and the temperature of water obtained from the valve 10.

The stem adaptor 38 is received between the detent cap 40 and the thermostatic cartridge 36 and is maintained in position by a fastener 46 received in an aperture 47 in a distal end of the spline adaptor 38. The retaining ring 44 is received over the overcap 40, and is threaded into the cartridge chamber 26. The wave compression spring 42 is positioned between the overcap 40 and the retaining ring 44, and provides a force on the overcap 40 to maintain the overcap 40 against the drive spindle 37 of the thermostatic cartridge 36, and to maintain the teeth 31 mated with the teeth 41.

Referring still to FIG. 7 and also to FIG. 8, the stem adaptor 38 includes a rotational stop tab 39 that mates with the minimum and maximum temperature tabs 33 and 35 in the cartridge 36 to provide a rotational stop of minimum and maximum temperature, and a detent member in the form of a comfort temperature tab 43. The comfort tab 43 extends radially from the outer circumference of the adaptor 38, and is substantially centered adjacent an elongate aperture 76 inset from the outer edge of the spline adaptor 38. The aperture 76 allows the tab 43 to "flex" inward and outward, as described below.

Referring still to FIG. 8, the overcap 40 is substantially cylindrical in shape, including a plurality of teeth 41 extending radially outward and sized and dimensioned to mate with the teeth 31 on the cartridge 36 at a variety of possible positions. A mating detent member, here a ramp 72, is also provided extending from an inner surface of the detent overcap 40, and positioned a distance above the teeth 41. When assembled, the ramp 72 interacts with the comfort temperature tab 43 on the rotational stem adaptor 38 to provide an indication to the user when the comfort position is key reached, also as described below. This is in the form of resistance to turning. However, further turning past this point is still possible.

Figure 1:
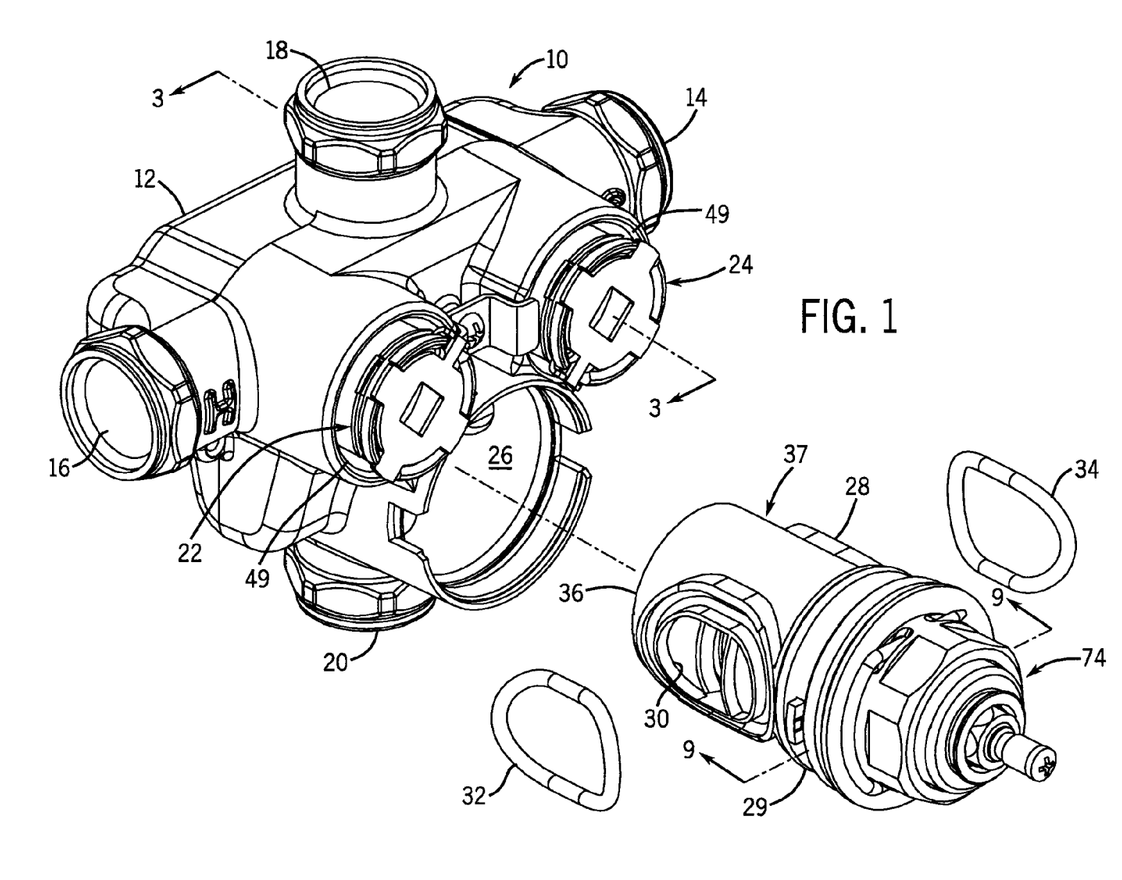
FIG. 1 is a partially exploded perspective view of a valve of the present invention, illustrating the thermostatic cartridge assembly and sealing gaskets.
Figures 9, 10:
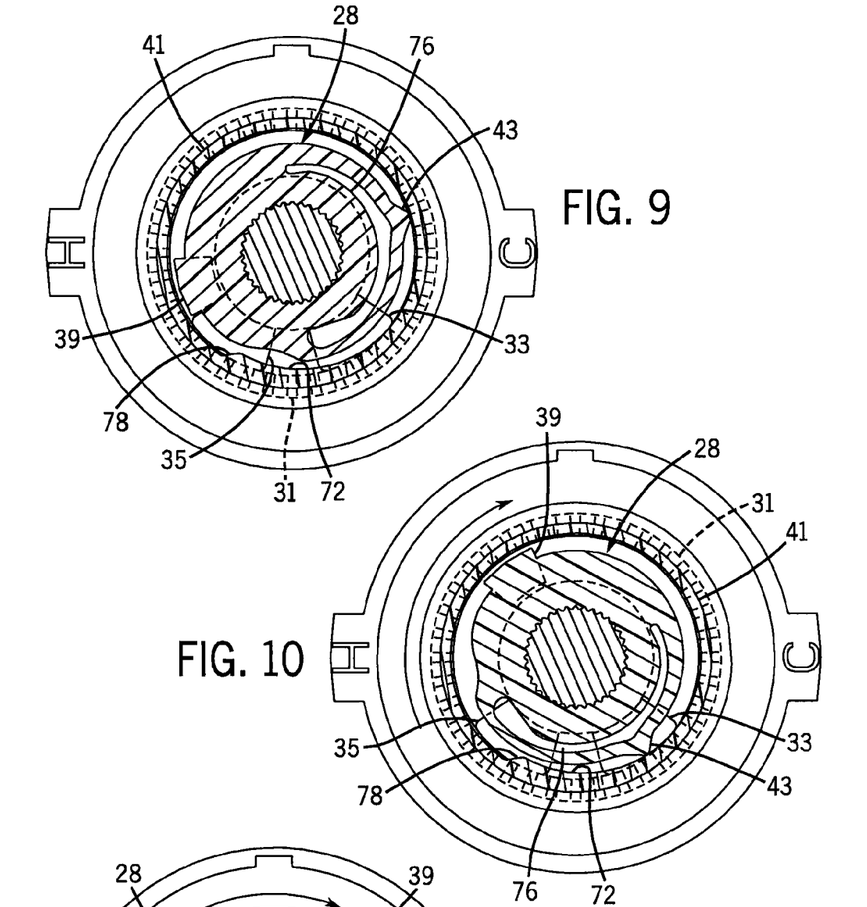
FIG. 9 is a view taken along the line 9-9 of FIG. 1, illustrating the relative positions of the components at a maximum temperature.
FIG. 10 is a view taken along the line 9-9 of FIG. 1, illustrating the relative positions of components when the temperature is below the comfort level.
Figure 11:
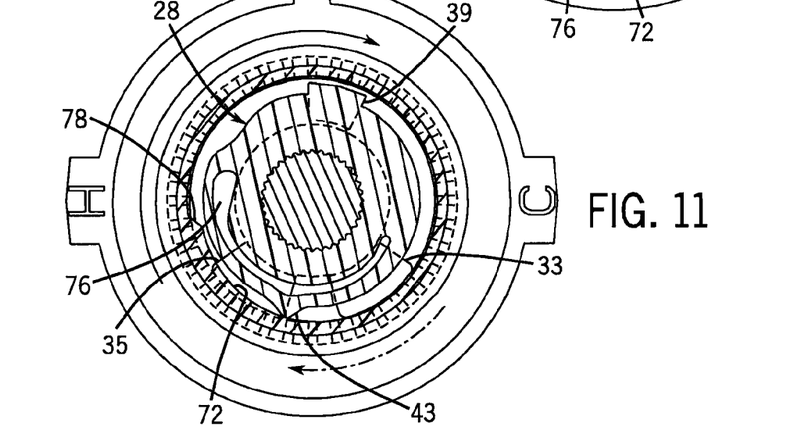
FIG. 11 is a view taken along the line 9-9 of FIG. 1, illustrating the relative positions of components when the comfort level is being reset.

Referring now to FIGS. 9-11, a cutaway view of the temperature setting assembly 74 taken along the line 9-9 in FIG. 1 is shown as the assembly 74 is moved to varying positions. Referring first to FIG. 9, here the tab 39 on the rotational stem adaptor 38 is shown in contact with the maximum temperature tab 35 on the cartridge 36, indicating that the maximum temperature has been reached. Although a number of different temperatures can be selected, a maximum anti-scald temperature of 120 degree Fahrenheit is typical.

Referring now to FIG. 10, here the temperature setting assembly 74 is shown rotated to a new position, and the comfort tab 43 is shown approaching the ramp 72 in the cap 40. The comfort tab 43 follows the ramp 72 to a high point 78 at which the user will feel the tab 43 fall off of the ramp 72 indicating that the selected comfort temperature has been reached. As the tab 43 is moved along the ramp 72, the aperture 76 formed in the adaptor 38 following the outer surface of the adaptor 38 allows the bottom surface of the rotational stem adaptor 38 to flex inward. Therefore, the tab 43 can move radially inward as it follows the ramp 72 and flex back out as it passes the high point 78. The comfort tab 43 does not provide an actual "stop", but can be moved past the comfort position if desired. Rotation would then be allowed to continue until the tabs 35 and 39 meet, as discussed above.

Referring now to FIG. 11, the relative position of the components in the temperature setting assembly 74 are shown as an adjustment to the selected comfort temperature is made. To adjust the selected temperature, a user pulls on the overcap 40 axially to remove the teeth 41 in the overcap 40 from the teeth 31 in the undercap 29 of the cartridge 36. When the teeth are disengaged, the overcap 40 can be rotated to a new position, to reposition the ramp 72 relative to the stops 33 and 35. When the ramp 72 is in the position selected by the user, the overcap 40 is released so that the teeth 31 re-engage with the teeth 41. The point 78 is therefore repositioned, providing an adjustment in the selected comfort temperature, while the stop tabs 35 and 39 remain in the same orientation, thereby maintaining the selected maximum temperature irrespective of the selected comfort temperature. The wave compression spring 42 maintains a force on the detent overcap 40 to assure that the teeth 31 and 41 are engaged.

The invention therefore provides a number of advantages. The check valve inserts provide check valves concentric with a shut-off device, which helps to reduce the overall size of the valve. The check valves, moreover, can be serviced with a single tool, thereby simplifying maintenance of the valve. Furthermore, servicing can be done by even those with minimal plumbing skill. Further, a comfort temperature selection is provided which allows the user to select a comfort level setting without affecting the maximum temperature.

It will be appreciated that a variety of changes can be made to this structure without departing from the spirit or scope of the invention. For example, although a specific driving tool is described above, various other tools could also be used. Additionally, although the valve is shown and described as providing only a temperature mixing function, volume controls can also be integrated with the valve, particularly in the inlet and outlet ports. Still other modifications could be made within the scope and spirit of the invention.

INDUSTRIAL APPLICABILITY

Disclosed are mixer valves useful in shower and other bathing installations.

What is claimed is:

1. An assembly for setting an output temperature for a thermostatic mixer valve having a maximum temperature limiting arrangement corresponding to a maximum temperature setting, the assembly comprising:
    a thermostatic mixing cartridge having a drive spindle rotatable about an axis and an undercap having a first stop tab corresponding to the maximum temperature setting;
    an overcap including a first detent member; and
    a rotational stem adaptor coupled to the drive spindle to rotate about the axis between the undercap and the overcap and having a second detent member and a second stop tab, wherein the first stop tab interacts with the second stop tab to prevent rotation of the stem adapter beyond a position corresponding to the maximum temperature setting and wherein the first detent member interacts with the second detent member to provide user feedback indicating a comfort temperature setting which is different from the maximum temperature setting and wherein the first and second detent members disengage to allow the stem adaptor to rotate until the second stop tab engages the first stop tab.

2. The assembly as recited in claim 1, wherein the undercap includes a first plurality of teeth.

3. The assembly as recited in claim 2, wherein the overcap includes a second plurality of teeth that mate with the first plurality of teeth and wherein the overcap is movable along the axis to disengage the first plurality of teeth and rotate about the axis with respect to the undercap.

4. The assembly as recited in claim 1, wherein the first detent member is a ramp.

5. The assembly as recited in claim 1, wherein the second detent member is a flexible tab.

* * * * *